United States Patent [19]

Futami et al.

[11] Patent Number: 5,229,693
[45] Date of Patent: Jul. 20, 1993

[54] DRIVING CONTROL APPARATUS FOR BRUSHLESS MOTOR WITH OPTIMUM CONTROLLED CONVERTER

[75] Inventors: Toshihiko Futami, Kanagawa; Shigeya Tanimoto, Chita, both of Japan

[73] Assignee: Kabushiki Kaisha Toshiba, Kawasaki, Japan

[21] Appl. No.: 827,161

[22] Filed: Jan. 28, 1992

[30] Foreign Application Priority Data

Feb. 28, 1991 [JP] Japan .................................. 3-034369

[51] Int. Cl.$^5$ ............................................ H02K 29/00
[52] U.S. Cl. ..................................... 318/254; 318/138
[58] Field of Search .................. 318/138, 254, 439; 310/68 R

[56] References Cited

U.S. PATENT DOCUMENTS

| | | | |
|---|---|---|---|
| 4,528,485 | 7/1985 | Boyd, Jr. ................. | 318/138 |
| 4,608,527 | 8/1986 | Glennon et al. ........... | 318/685 |
| 4,651,068 | 3/1987 | Meshkat-Razavi ........... | 318/254 |
| 4,818,908 | 4/1989 | Tamae et al. ............. | 310/171 |
| 4,835,448 | 5/1989 | Dishner et al. ........... | 318/254 |
| 4,888,533 | 12/1989 | Gotoh et al. ............. | 318/524 |

FOREIGN PATENT DOCUMENTS 58-25038  5/1983  Japan .
63-5436   2/1988  Japan .

OTHER PUBLICATIONS

TLP 557; Toshiba; pp. 359-363.
TLP521-1,-2,-3,-; Toshiba; pp.294-299.

*Primary Examiner*—Bentsu Ro
*Attorney, Agent, or Firm*—Cushman, Darby & Cushman

[57] ABSTRACT

A position detector detects the position of a rotor of a brushless motor. A driving signal generator generates a driving signal at a timing corresponding to the detected position. While the driving signal is received, a driving circuit sequentially ON/OFF-operates switching elements of an inverter circuit. At this time, a rotational speed detector detects a rotational speed of the brushless motor. A rotational speed controller controls the duty of ON/OFF operations of the switching elements, performed by the driving circuit, through a chopper signal generator in accordance with the difference between a detected rotational speed and a designated rotational speed. If the detected rotational speed does not reach the designated rotational speed even when the duty becomes a preset value or more, the rotational speed controller generates a phase shift signal for advancing the phase of the driving signal from that of a driving signal in a normal operation, and supplies it to the driving signal generator. Upon this phase shift operation, in the brushless motor, a magnetic flux effectively acting from the rotor to armature windings is reduced as compared with a magnetic flux in a normal operation. Thus, the rotational speed of the brushless motor can be reliably set to a desired value without decreasing the operation efficiency.

6 Claims, 10 Drawing Sheets

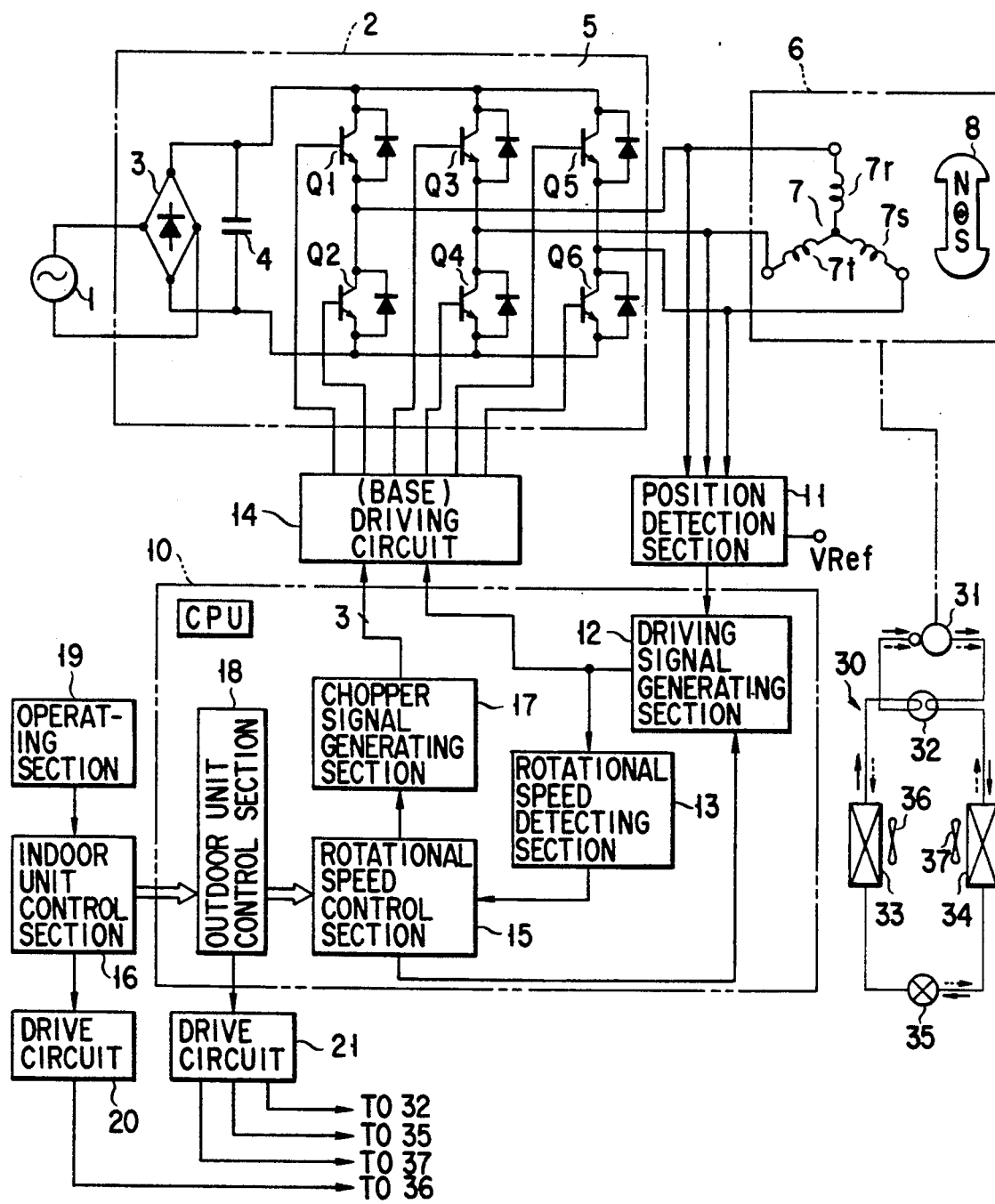
F I G. 1

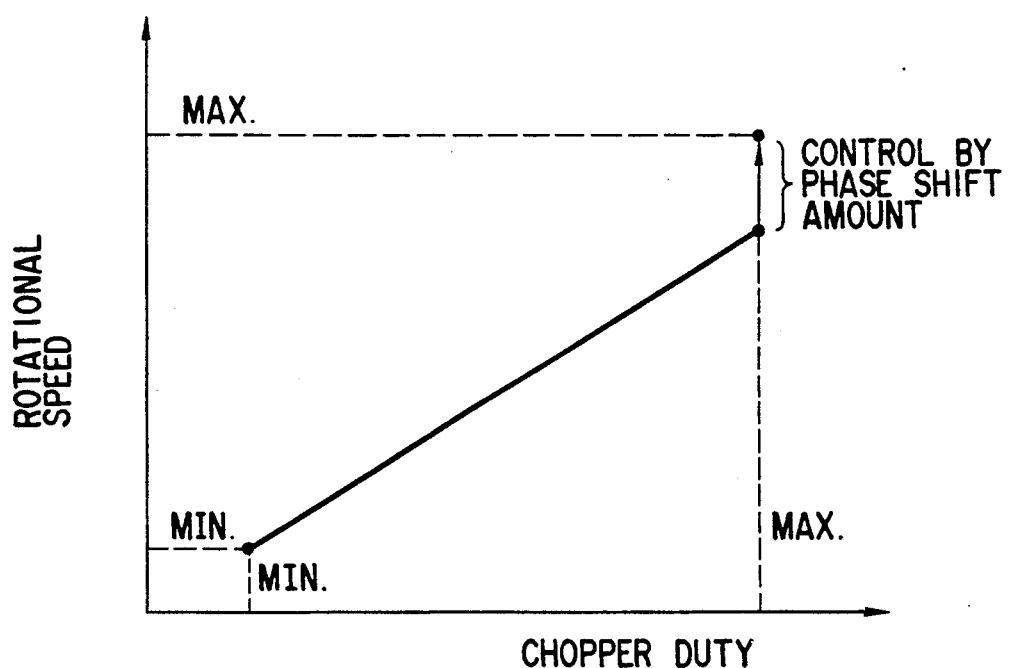
F I G. 6A
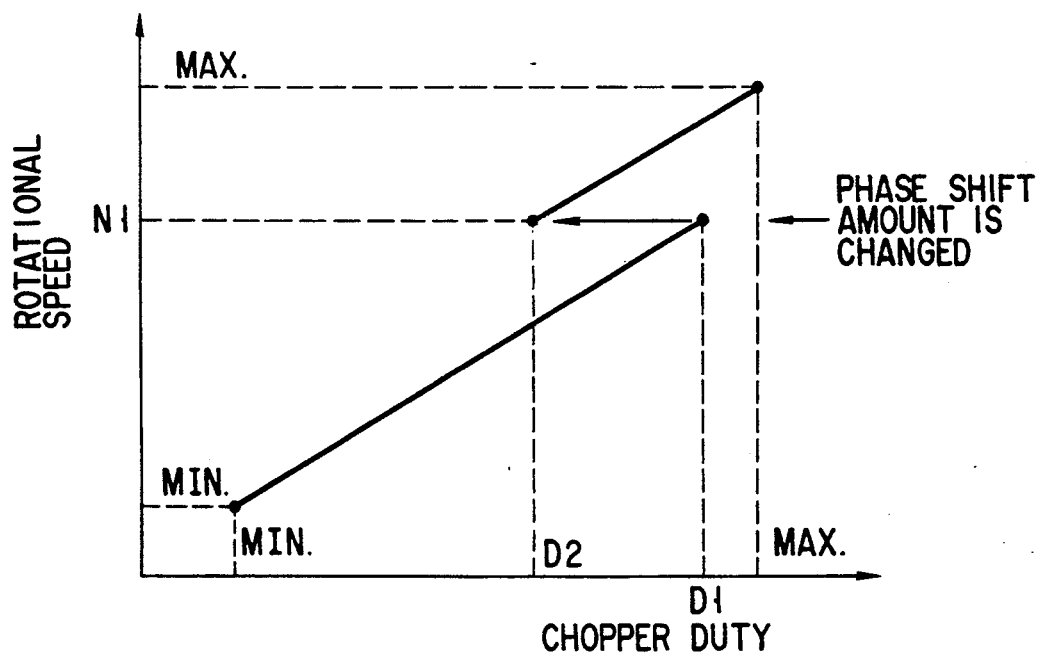
F I G. 6B

DRIVING CONTROL APPARATUS FOR BRUSHLESS MOTOR WITH OPTIMUM CONTROLLED CONVERTER

Background of the Invention

1. Field of the Invention

The present invention generally relates to a driving control apparatus for a brushless motor and, more particularly, to a driving control apparatus for a brushless motor which is designed to drive a compressor of a home air conditioner and can contribute to a reduction in energy consumption.

2. Description of the Related Art

Recently, as a motor for driving a compressor of an air conditioner, a so-called non-commutator motor (to be referred to as a brushless motor hereinafter, since it is generally called so) has been increasingly used. This motor has substantially the same characteristics as those of a DC motor but includes no mechanical commutator. It is expected that the use of such a brushless motor can improve the overall efficiency of an air conditioner by several percent as compared with an air conditioner using an induction motor, thus contributing to a reduction in energy consumption.

As an apparatus for driving such a brushless motor, a conventional apparatus using an inverter circuit, disclosed in e.g., Published Examined Japanese Patent Application No. 58-25038, is known. In this apparatus, a driving signal for the inverter circuit is generated by detecting the position of the rotor of the motor on the basis of a voltage induced in an armature winding of the motor.

In this case, a rotational speed N of the brushless motor is determined according to the following equation:

$$N = K\{(Es - Ia \cdot Ra)/\Phi\}$$

where K is a constant, Es is the output voltage from the inverter circuit (a voltage to be applied to the brushless motor), Ia is the current flowing in the armature winding, Ra is the resistance of the armature winding, and $\Phi$ is the magnetic flux effectively acting from the rotor to the armature winding.

In general, the output voltage Es is changed by changing the ON/OFF duty of a switching element of the inverter circuit by means of a chopper on the basis of the above-mentioned driving signal, thereby performing rotational speed control. With this control, the capacity of the compressor in the air conditioner is variably controlled.

The rotational speed N of the brushless motor is determined in accordance with the output voltage Es from the inverter circuit. In practice, however, the rotational speed N changes due to the influence of an input voltage Vin to the inverter circuit or a load, as shown in FIG. 7.

More specifically, assume that the input voltage Vin to the inverter circuit is low or the load is large. In this case, even if the output voltage Es is applied under the maximum duty condition, the motor may not reach a designated rotational speed. In such a case, the output of the motor becomes insufficient, resulting in lack of the capacity of the compressor in the air conditioner.

Furthermore, in an air conditioner which operates at a commercial AC power source voltage of 100V, an input current Iin to an inverter circuit must be limited to 20 A or less. For this reason, the frequency of occurrence of insufficient output of the brushless motor, i.e., lack of the capacity of the compressor, conspicuously increases.

FIG. 8 shows the relationship between the rotational speed of a brushless motor and a load in a case wherein the input current Iin is constant. As indicated by changes from solid lines to alternate long and dashed lines, the maximum value of the rotational speed N is greatly decreased with a decrease in the input voltage Vin.

Note that broken lines in FIG. 8 indicate the characteristics of an induction motor. The maximum value of the rotational speed N of the induction motor does not vary much regardless of the magnitude of the input voltage Vin. This is because the rotational speed N of the induction motor mainly depends on the output frequency of the inverter circuit. That is, as shown in FIG. 9, under the condition that the input current Iin to the inverter circuit is lower than a predetermined value, the operating range of the brushless motor is much narrower than that of the induction motor which has been used to drive a compressor of an air conditioner.

Such inconvenience of a brushless motor poses a serious problem which must be solved if the brushless motor is used for a heat pump type air conditioner which is required to quickly reach its full capacity especially in a heating operation.

In order to solve such a problem, as shown in FIG. 10, the rotational speed N may be set to be high in the process of design so as to prevent the rotational speed N of the brushless motor from decreasing even if the input voltage Vin to the inverter circuit is low.

The brushless motor designed to have a high rotational speed, however, is driven at a lower voltage than a brushless motor designed to have a low rotational speed, under the conditions of the same rotational speed and load. The operating current increases accordingly to increase the loss of each switching element in the inverter circuit, resulting in an increase in voltage distortion factor. As a result, the operation efficiency is decreased, posing a new problem.

That is, if such a high-speed brushless motor is applied to a compressor of an air conditioner, the above-described drawback cancels out the effect of a reduction in energy consumption.

SUMMARY OF THE INVENTION

It is, therefore, an object of the present invention to provide a new and improved driving control apparatus for a brushless motor with an optimum controlled inverter, in which the rotational speed of a brushless motor can be reliably set to be a desired value regardless of the magnitude of an input voltage to the inverter circuit, a large load, and limitations on an input current to the inverter circuit, without causing a decrease in operation efficiency, and which can be applied to, e.g., the driving of a compressor of a home air conditioner to ensure a reduction in overall energy consumption and prevent reduction of the capacity of the compressor.

According to a first aspect of the present invention, there is provided a driving control apparatus for a brushless motor having a plurality phase of armature windings and a rotor, comprising:

inverter means, having a plurality of switching elements, for converting DC power into multiphase AC power having a predetermined frequency by sequentially switching the plurality of switching elements, and for applying the AC power, as multiphase excitation voltages having a predetermined phase difference, to the plurality phase of armature windings of the brushless motor position detecting means for comparing voltages induced in the plurality phase of armature windings with a predetermined reference voltage and detecting position signals to detect relative positions between the plurality phase of armature windings and the rotor of the brushless motor;

driving signal generating means for generating driving signals, each having a predetermined timing relationship with a corresponding one of the position signals detected by the position detecting means;

driving means for supplying switching signals, used for sequentially ON/OFF-operating the plurality of switching elements at a duty corresponding to a designated rotational speed of the brushless motor, to the inverter means in accordance with the driving signals generated by the driving signal generating means;

rotational speed detecting means for detecting a rotational speed of the brushless motor in accordance with the driving signals generated by the driving signal generating means; and rotation control means for supplying a control signal, used for controlling the duty within a predetermined range, to the driving means in accordance with a difference between the rotational speed detected by the rotational speed detecting means and the designated rotational speed, and supplying a phase shift signal, used for advancing the timing relationship between the position signals and the driving signals from the predetermined timing relationship, to the driving signal generating means if the detected rotational speed does not reach a maximum value of the designated rotational speed even when the duty becomes a maximum value within the predetermined range.

According to a second aspect of the present invention, there is provided a driving control apparatus for a brushless motor having a plurality phase of armature windings and a rotor, comprising:

inverter means, having a plurality of switching elements, for converting DC power into multiphase AC power having a predetermined frequency by sequentially switching the plurality of switching elements, and for applying the AC power, as multiphase excitation voltages having a predetermined phase difference, to the plurality phase of armature windings of the brushless motor;

position detecting means for comparing voltages induced in the plurality phase of armature windings with a predetermined reference voltage and detecting position signals to detect relative positions between the plurality phase of armature windings and the rotor of the brushless motor;

driving signal generating means for generating driving signals, each having a predetermined timing relationship with a corresponding one of the position signals detected by the position detecting means;

driving means for supplying switching signals, used for sequentially ON/OFF-operating the plurality of switching elements at a duty corresponding to a designated rotational speed of the brushless motor, to the inverter means in accordance with the driving signals generated by the driving signal generating means;

rotational speed detecting means for detecting a rotational speed of the brushless motor in accordance with the driving signals generated by the driving signal generating means; and rotation control means for supplying a control signal, used for controlling the duty within a predetermined range, to the driving means in accordance with a difference between the rotational speed detected by the rotational speed detecting means and the designated rotational speed, and supplying a phase shift signal, used for advancing the timing relationship between the position signals and the driving signals from the predetermined timing relationship, to the driving signal generating means when the designated rotational speed reaches a predetermined value.

According to a third aspect of the present invention, there is provided a driving control apparatus for a brushless motor, in a device including the brushless motor, comprising:

an inverter circuit for rectifying an AC power source voltage, converting the rectified voltage into a multiphase voltage having a predetermined frequency by ON/OFF operations of switching elements, and outputting the multiphase voltage, as an excitation voltage, to the brushless motor;

means for detecting a position of a rotor of the brushless motor;

means for generating a driving signal at a timing corresponding to a detected position;

means for ON/OFF-operating the switching elements of the inverter circuit while the driving signal is received;

means for detecting a rotational speed of the brushless motor;

means for controlling a duty of the ON/OFF operations in accordance with a difference between a detected rotational speed and a designated rotational speed; and means for advancing a phase of the driving signal from that of a driving signal in a normal operation if the detected rotational speed does not reach the designated rotational speed even when the duty is not less than a preset value, or if the designated rotational speed is not less a predetermined value.

According to the above-described arrangement, the position of the rotor of the brushless motor is detected, and a driving signal is generated at a timing corresponding to the detected position. While this driving signal is output, the switching elements of the inverter circuit are ON/OFF-operated. At this time, the rotational speed of the brushless motor is detected. The duty of the ON/OFF operations is then controlled in accordance with the difference between the detected rotational speed and a designated rotational speed. If the detected rotational speed does not reach the designated rotational speed even when the duty becomes a preset value or more, or if the designated rotational speed is a predetermined value or more, the phase of the driving signal is advanced from that of a driving signal in a normal operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

Brief Description of the Drawings

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing the arrangement of a control circuit according to an embodiment of the present invention;

FIG. 6A is a graph showing a case wherein the amount of phase shift of the driving signal is controlled when the designated rotational speed of a brushless motor is not reached at a maximum duty;

FIG. 6B is a graph showing a case wherein the phase shift amount is changed when a designated rotational speed is a predetermined value or more at a predetermined duty;

DETAILED DESCRIPTION OF THE PREFERRED EMBODIMENTS

Figure 2A:
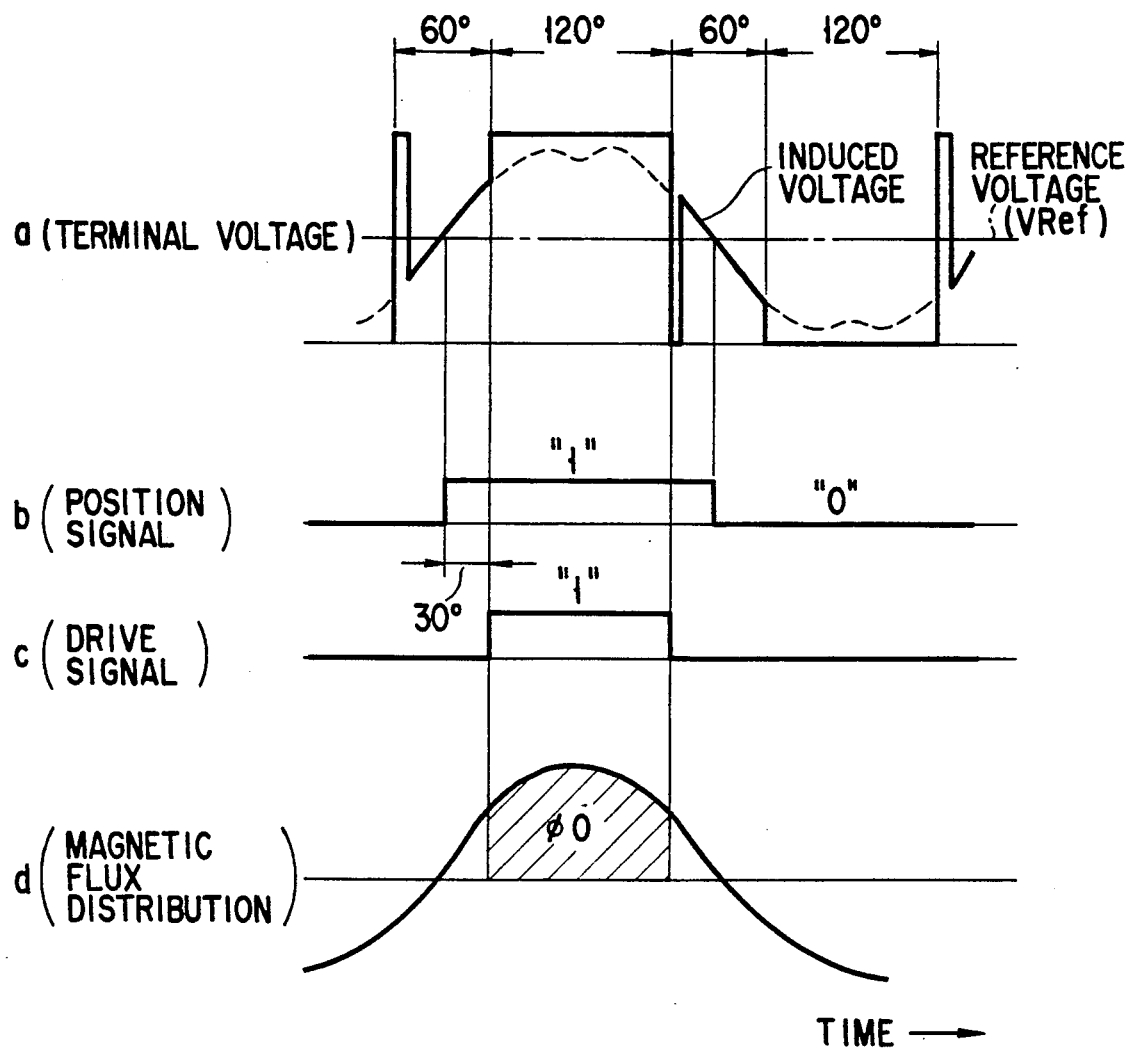
FIG. 2A is a timing chart for explaining the function of the embodiment during a normal operation.

Reference will now be made in detail to the presently preferred embodiments of the invention as illustrated in the accompanying drawings, in which like reference characters designate like or corresponding parts throughout the several drawings.

An embodiment of the present invention, which is applied to a heat pump type air conditioner, will be described below with reference to FIG. 1.

An inverter circuit 2 is connected to a commercial AC power source 1. A three-phase brushless motor 6 is connected to the inverter circuit 2.

In this inverter circuit 2, an AC voltage (single-phase 100V) is rectified/smoothed by a diode bridge 3 and a smoothing capacitor 4. The resulting voltage is converted into a three-phase rectangular wave voltage having a predetermined frequency upon ON/OFF operations of a plurality (six) of switching elements Q1 to Q6 which are connected to constitute a three-phase bridge in a switching circuit 5. The three-phase voltage is then output as an excitation voltage to a brushless motor 6.

The brushless motor 6 is mechanically coupled to a compressor 31 in a heat pump type refrigeration cycle 30 to drive it.

The brushless motor 6 comprises an armature 7 and a rotor (permanent magnet) 8. The positions of armature windings 7r, 7s, and 7t, relative to the field pole of the rotor 8 are detected, and the armature windings 7r, 7s, and 7t are sequentially excited. As a result, the rotor 8 is rotated.

A position detecting section 11 is connected to the armature windings 7r, 7s, and 7t of the brushless motor 6.

The position detecting section 11 includes a comparator and serves to receive voltages induced in the armature windings 7r, 7s, and 7t, respectively, and detect the positions, of the armature windings 7r, 7s, and 7b, relative to the field pole of the rotor 8 on the basis of the induced voltages. The position detecting section 11 compares the respective induced voltages with a reference voltage VRef, and sequentially outputs the comparison results as position signals. These position signals are supplied to a driving signal generating section 12 in a central processing unit (to be referred to as a CPU hereinafter) 10.

In a normal operation in which no phase shift signal is supplied from a rotational speed control section 15 (to be described later) in the CPU 10, the driving signal generating section 12 sequentially generates driving signals (logic "1" level), each having a predetermined time width (a phase difference angle of 120°) delayed in phase by 30° from a corresponding position signal (logic "1" level) supplied from the position detecting section 11. Upon reception of a phase shift signal from the rotational speed control section 15, the driving signal generating section 12 sequentially generates driving signals, each having a phase advanced by a predetermined value from the phase of a phase shift signal in a normal operation.

The respective driving signals generated by the driving signal generating section 12 are supplied to a rotational speed detecting section 13 and a driving circuit 14 in the CPU 10.

The rotational speed detecting section 13 detects a rotational speed N of the brushless motor 6 on the basis of each driving signal. The detection result is supplied to the rotational speed control section 15.

In addition, a rotational speed setting command corresponding to a capacity set value of the compressor 31, set by an operating section 19 is supplied to the rotational speed control section 15 through an indoor unit control section 16 and an outdoor unit control section 18 in the CPU 10.

The rotational speed control section 15 obtains the difference between the contents of the rotational speed setting command, i.e., the designated rotational speed and the rotational speed N detected by the rotational speed detecting section 13, and outputs a voltage signal having a level corresponding to the difference. In addition, the rotational speed control section 15 generates a phase shift signal if the detected rotational speed N does not reach the designated rotational speed within a predetermined period of time after the output voltage level becomes a preset value or more.

The output voltage from the rotational speed control section 15 is supplied to a chopper signal generating section 17. The phase shift signal is supplied to the driving signal generating section 12.

The chopper signal generating section 17 generates a three-phase chopper signal at an ON/OFF duty corresponding to the output voltage level from the rotational speed control section 15. This chopper signal is supplied to the driving circuit 14 constituted by a base drive circuit, disclosed in, e.g., Published Examined Japanese Utility Model Application No. 63-5436. The base drive circuit can be realized by using a photocoupler such as a TLP 557 (Toshiba) or one of TLP 521-1 to TLP 521-4 (Toshiba), and a well known hybrid IC for current-amplifying.

That is, the CPU 10 executes the following functions by using the rotational speed control section 15 and the chopper signal generating section 17: controlling the ON/OFF duty of the switching elements Q1 to Q6 of the inverter circuit 2 in accordance with the difference between the detected rotational speed N and a designated rotational speed and advancing the phase of a driving signal from that of a driving signal in a normal operation when the detected rotational speed N does not reach the designated rotational speed within a predetermined period of time after the duty becomes a preset value or more.

While the respective driving signals are received from the driving signal generating section 12, the driving circuit 14 outputs switching signals, each having a predetermined logic pattern, required to rotate the three-phase brushless motor 6 by sequentially ON-/OFF-operating the switching elements Q1 to Q6 of the switching circuit 5 in accordance with the respective chopper signals supplied from the chopper signal generating section 17.

Note that the refrigeration cycle 30 is designed such that a four-way valve 32, indoor and outdoor heat exchangers 33 and 34, and an electronic control expansion valve 35 communicate with the variable-capacity compressor 31 driven by the brushless motor 6, through refrigerant pipes so as to constitute a heat pump type refrigeration cycle.

The indoor unit control section 16 drives an indoor fan 36 through a drive circuit 20. The outdoor unit control section 18 drives the four-way valve 32, the electronic control expansion valve 35, and an outdoor fan 37 through a drive circuit 21.

In a cooling operation, a refrigerant circulates in directions indicated by solid arrows in FIG. 1 (compressor 31→four-way valve 32→outdoor heat exchanger 34→electronic control expansion valve 35→indoor heat exchanger 33→four-way valve 32→compressor 31), and evaporates in the indoor heat exchanger 33 to absorb latent heat of vaporization from a room to be air-conditioned, thus achieving a cooling function.

In a heating operation, the refrigerant circulates in directions indicated by broken arrows in FIG. 1 (compressor 31→four-way valve 32→indoor heat exchanger 33→electronic control expansion valve 35→outdoor heat exchanger 34→four-way valve 32→compressor 31), and condenses in the indoor heat exchanger 33 to emit heat of condensation into the room to be air-conditioned, thus achieving a heating function.

A function of the apparatus having the above-described arrangement will be described below.

A sequence of operations will be described first with reference to the timing chart of FIG. 2A and the flow chart of FIG. 2B.

When the commercial AC power source 1 is turned on and the inverter circuit 2 is driven, the inverter circuit 2 outputs three-phase rectangular wave voltages, each having a predetermined frequency. These rectangular wave voltages are respectively applied, as terminal voltages (a in FIG. 2A), to the armature windings $7r$, $7s$, and $7t$ of the brushless motor 6 so that the armature windings $7r$, $7s$, and $7t$ are sequentially excited. As a result, the rotor 8 of the brushless motor 6 is rotated.

Figure 2B:
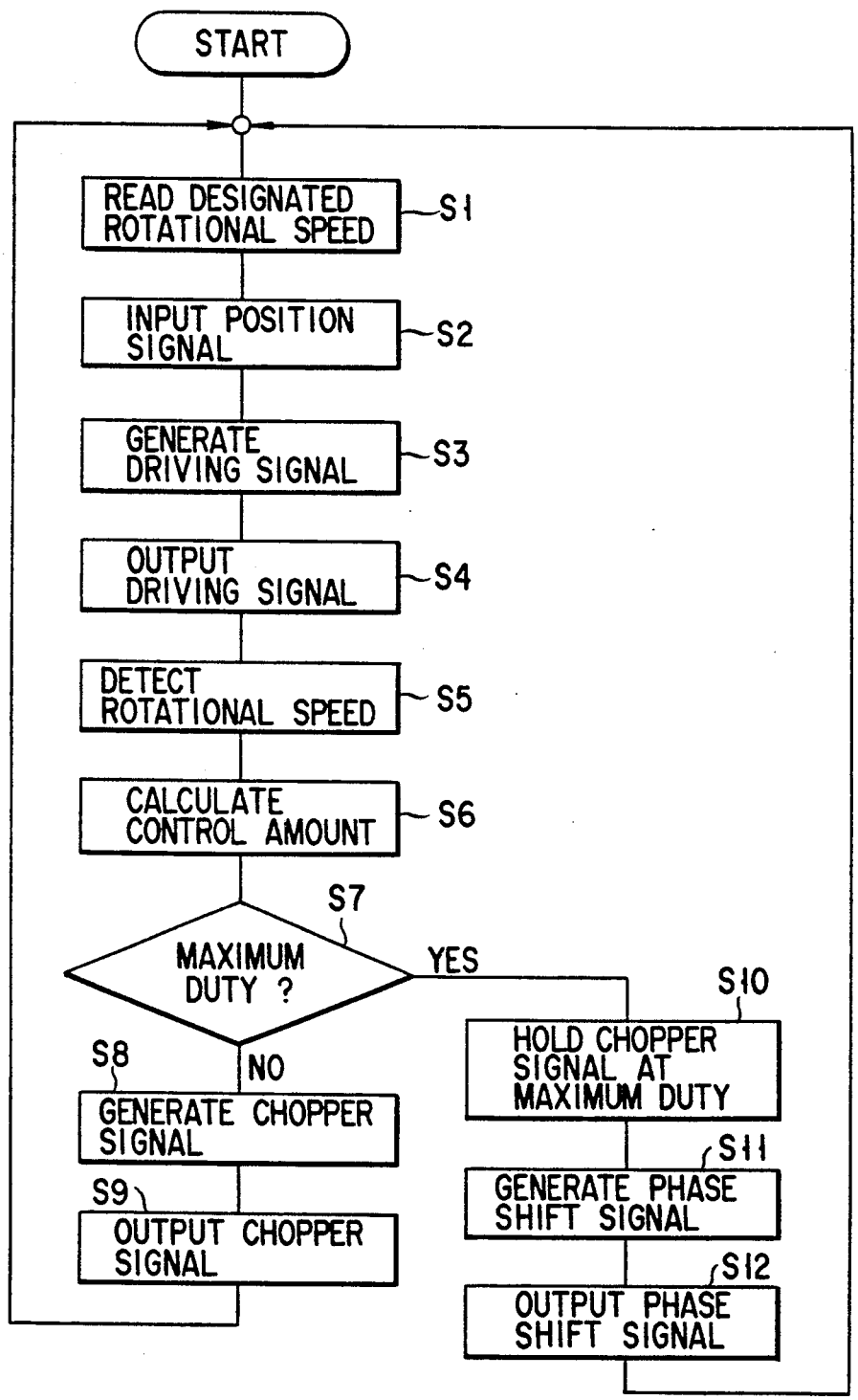
FIGS. 2B and 2C are flow charts for explaining main operations of the embodiment and its modification, respectively.

When the rotor 8 is rotated, voltages are respectively induced in the armature windings $7r$, $7s$, and $7t$ and are input to the position detecting section 11 (step S1 in FIG. 2B (FIG. 2B will be omitted hereinafter)).

Subsequently, the position detecting section 11 detects the positions, of the armature windings $7r$, $7s$ and $7t$ relative to the field pole of the rotor 8 on the basis of the comparison results obtained by comparing the respective induced voltages with the reference voltage VRef, and sequentially outputs position signals (b in FIG. 2A) corresponding to the detection results (step S2).

When the position signals are generated, the driving signal generating section 12 in the CPU 10 sequentially outputs driving signals (c in FIG. 2A; logic "1" level), each having a predetermined time width (a phase difference angle of 120°) delayed in phase by 30° from a corresponding one of the position signals (logic "1" level) (step S3). The generation timing of each driving signal corresponds to a portion of the magnetic flux distribution of the rotor 8 which includes the maximum number of lines of magnetic force. That is, a magnetic flux effectively acting from the rotor 8 to the armature windings $7r$, $7s$, and $7t$ is a magnetic flux $\Phi_0$ (d in FIG. 2A).

The rotational speed N of the brushless motor 6 is detected by the rotational speed detecting section 13 in the CPU 10 on the basis of the respective driving signals (steps S4 and S5).

A rotational speed setting command is supplied to the rotational speed control section 15 in the CPU 10 through the indoor and outdoor unit control sections 16 and 18 in the CPU 10. The rotational speed control section 15 then obtains the difference between the contents of the rotational speed setting command, i.e., a designated rotational speed, and the rotational speed N detected by the rotational speed detecting section 13. This rotational speed difference data is supplied to the chopper signal generating section 17 in the CPU 10 to generate a three-phase chopper signal at an ON/OFF duty corresponding to the rotational speed difference. In addition, each chopper signal is supplied to the driving circuit 14 together with a corresponding one of the respective driving signals (steps S6 to S9).

While the respective driving signals are supplied from the driving signal generator 12, the driving circuit 14 sequentially ON/OFF-operates the switching elements Q1 to Q6 of the switching circuit 5 in accordance with the respective chopper signals supplied from the chopper signal generating section 17.

With this ON/OFF operation, the brushless motor 6 is continuously rotated. As a result, the compressor 31 of the refrigeration cycle 30 is driven to perform a heating or cooling operation in accordance with an operation of the operating section 19.

In this case, if the detected rotational speed N is smaller than the designated rotational speed, the ON/-OFF duty of each chopper signal is increased, and the output voltage Es from the inverter circuit 2 is raised, thus increasing the rotational speed N of the brushless motor 6.

If the detected rotational speed N exceeds the designated rotational speed, the ON/OFF duty of each chopper signal is decreased, and the output voltage Es from the inverter circuit 2 is decreased, thus reducing the rotational speed N of the brushless motor 6.

With this operation, the capacity of the compressor 31 in the air conditioner is variably controlled to set the room (to be air-conditioned) at a preset temperature.

Assuming that an input voltage Vin to the inverter circuit 2 is low, a large load is set or limitations are imposed on an input current Iin to the inverter circuit 2. In such a case, even if the output voltage Es from the inverter circuit 2 becomes maximum, the rotational speed N of the brushless motor 6 may not reach a designated rotational speed. As a result, the output of the motor 6 becomes insufficient, resulting in lack of the capacity of the compressor 31 in the air conditioner.

In this case, the output voltage level of the rotational speed control section 15 in the CPU 10 is increased to a preset value or more, and the ON/OFF duty of a chopper signal reaches the allowable maximum value within a predetermined control range.

The rotational speed control section 15 in the CPU 10 generates a phase shift signal if the detected rotational speed N does not reach the designated rotational speed within a predetermined period of time after the output voltage level becomes the preset value or more. This phase shift signal is supplied to the driving signal generating section 12 in the CPU 10 (steps S6, S7, and S10 to S12).

Figure 3:
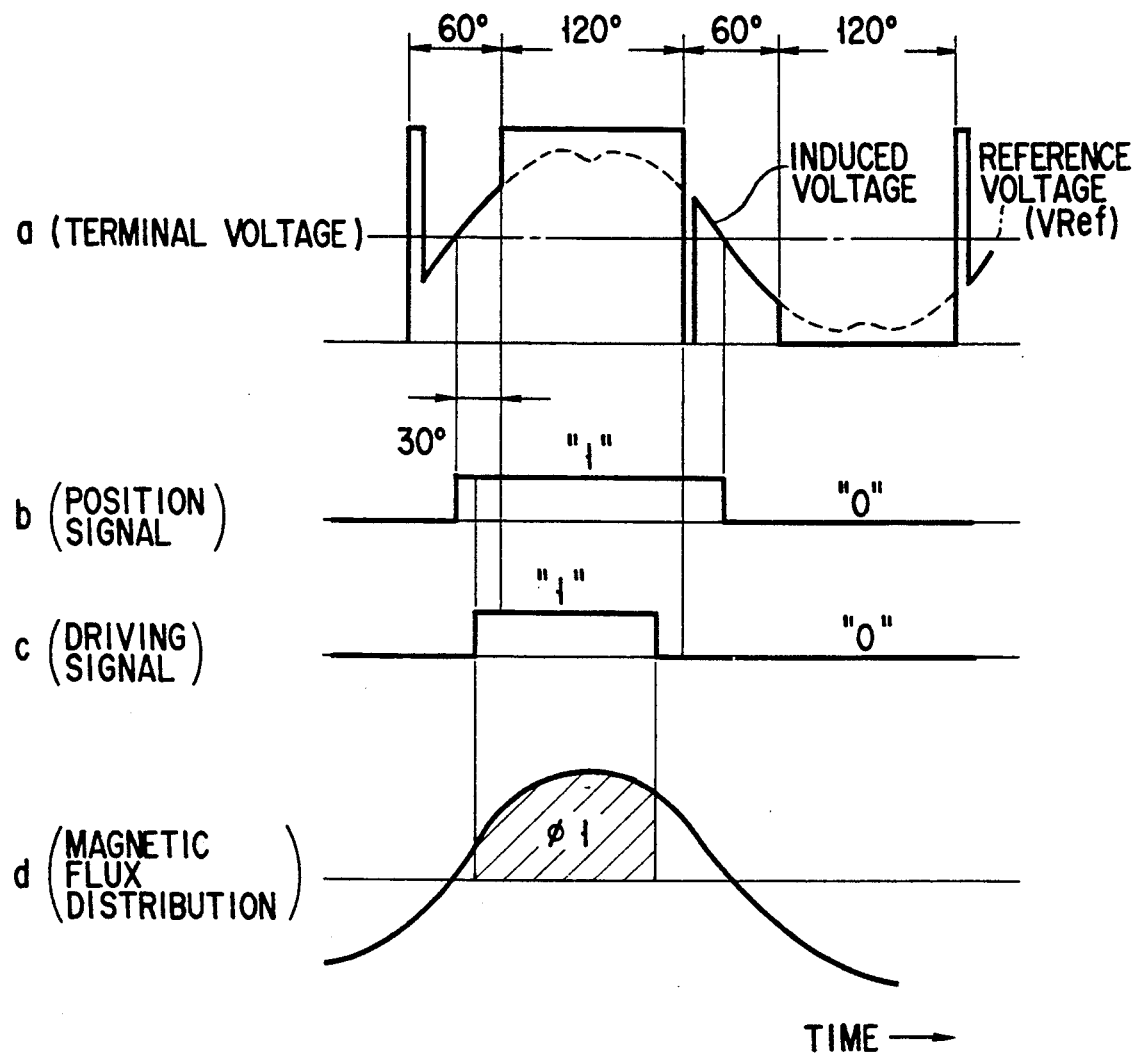
FIG. 3 is a timing chart for explaining the function of the embodiment during a phase shift period of a driving signal.

In response to the phase shift signal, the driving signal generating section 12 in the CPU 10 generates a driving signal having a phase advanced by a predetermined value from the phase of a driving signal in a normal operation, as indicated by c in FIG. 3. The generation timing of this driving signal deviates from a portion of the magnetic flux distribution of the rotor 8 which includes the maximum number of lines of magnetic force, as indicated by d in FIG. 3. That is, a magnetic flux $\Phi_1$ ($<\Phi_0$) effectively acting from the rotor 8 to the armature windings 7r, 7s, and 7t is smaller than that in a normal operation.

As is apparent from the equation described above, the rotational speed N of the brushless motor 6 is increased with a reduction in magnetic flux $\Phi$. Consequently, the rotational speed N reaches the designated rotational speed.

Figure 4A:
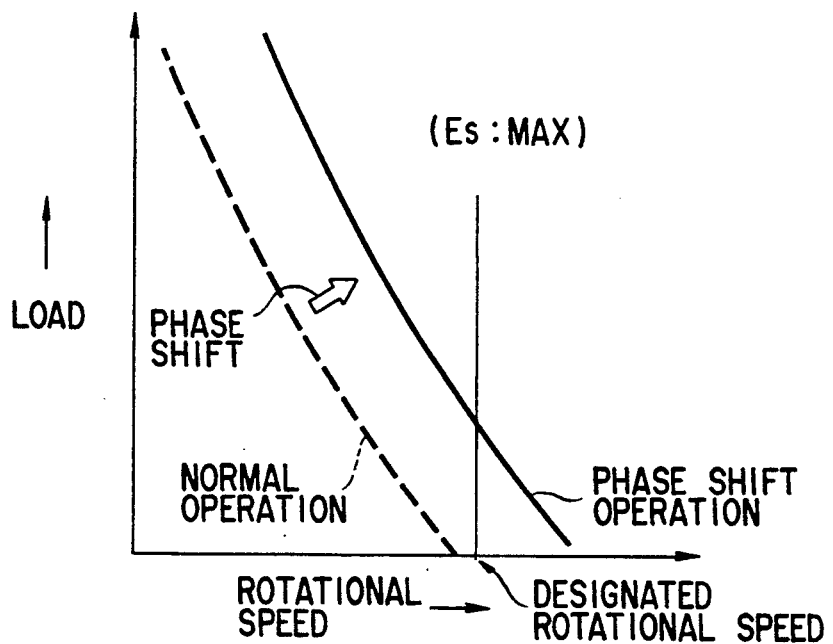
FIG. 4A is a graph showing the characteristics of a brushless motor according to the embodiment, which are obtained when an output voltage Es is kept maximum.
Figure 4B:
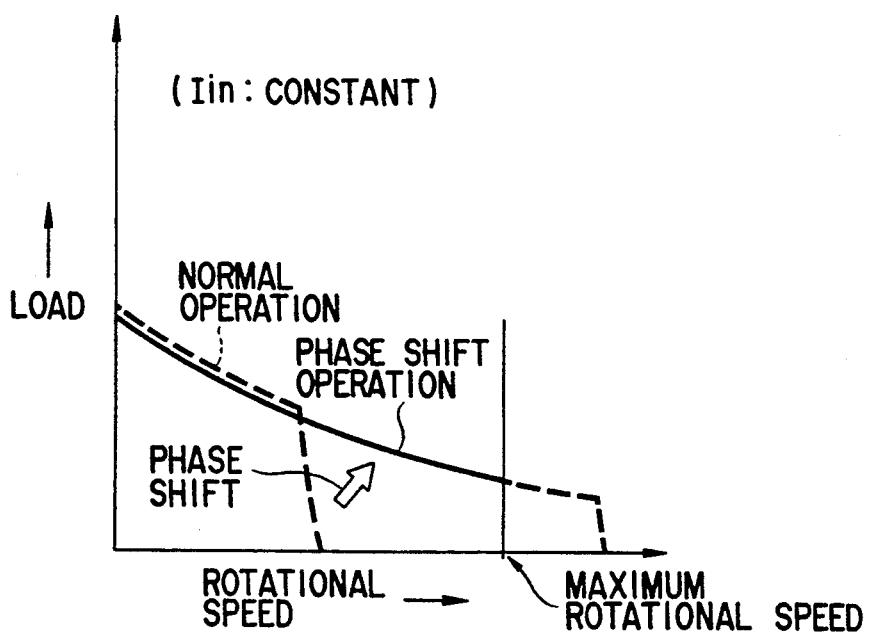
FIG. 4B is a graph showing the characteristics of the brushless motor according to the embodiment, which are obtained when an input current Iin to the brushless motor is kept constant.

FIGS. 4A and 4B show a change in characteristics of the brushless motor 6 before and after a phase shift operation. FIG. 4A shows the characteristics obtained when the output voltage Es from the inverter circuit 2 is constant. FIG. 4B shows the characteristics obtained when the input current Iin to the inverter circuit 2 is constant.

As is apparent from these graphs, if the rotational speed N is not increased as the output voltage Es from the inverter circuit 2 becomes maximum, the rotational speed N can be reliably set to the designated rotational speed by shifting the phase of a corresponding driving signal, thus preventing lack of the capacity of a compressor in an air conditioner. Especially in a heat pump type air conditioner, the compressor can quickly reach its full capacity in a heating operation.

In addition, since a brushless motor need not be designed to have a high rotational speed, unlike the conventional apparatus, an increase in loss of each switching element or deterioration in voltage distortion factor can be prevented, thus preventing a reduction in operation efficiency. That is, the effect of a reduction in energy consumption owing to the use of a brushless motor for driving a compressor of an air conditioner can be ensured.

Figure 5:
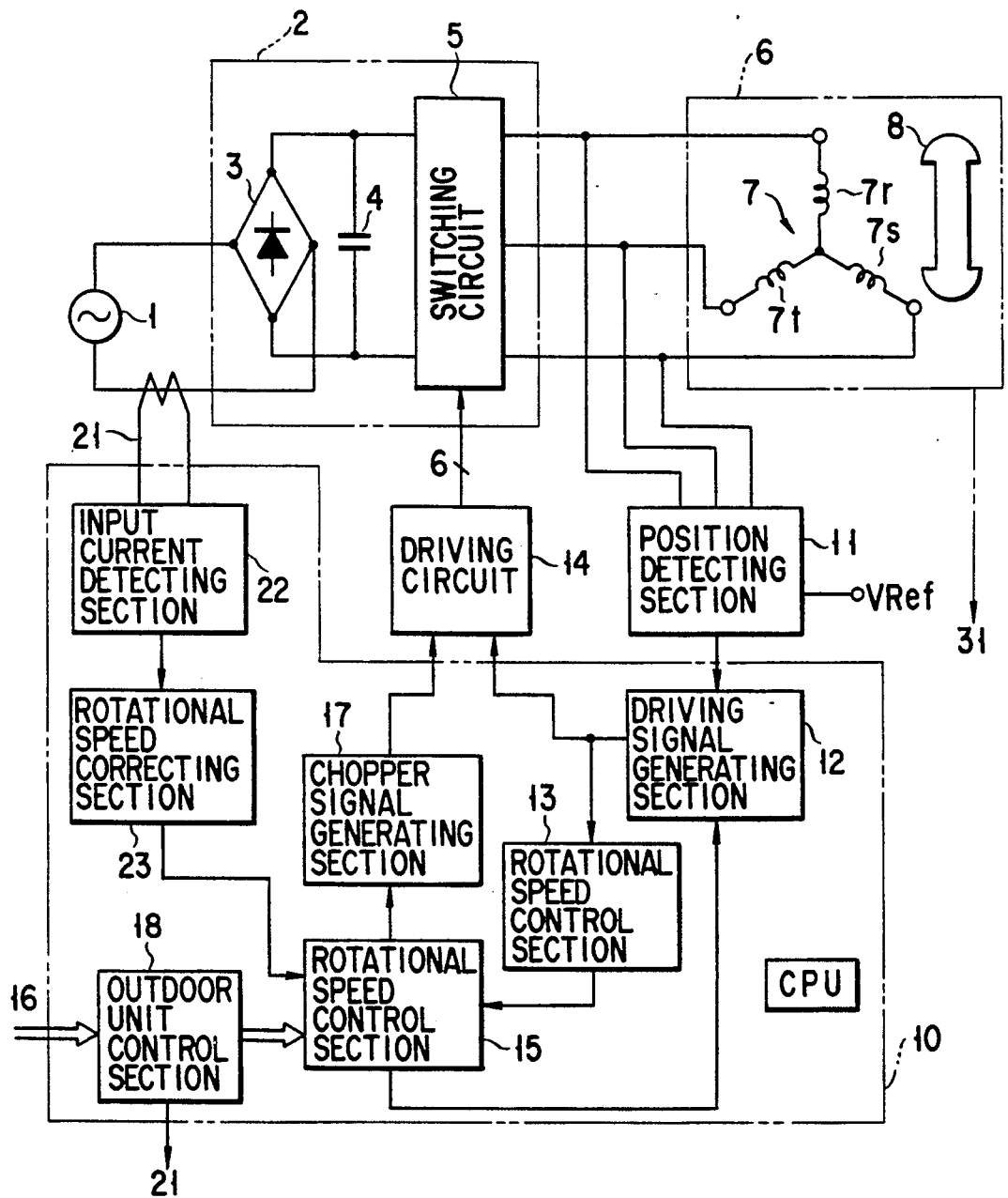
FIG. 5 is a block diagram showing the arrangement of a main part of a control circuit according to another embodiment of the present invention.
Figure 7:
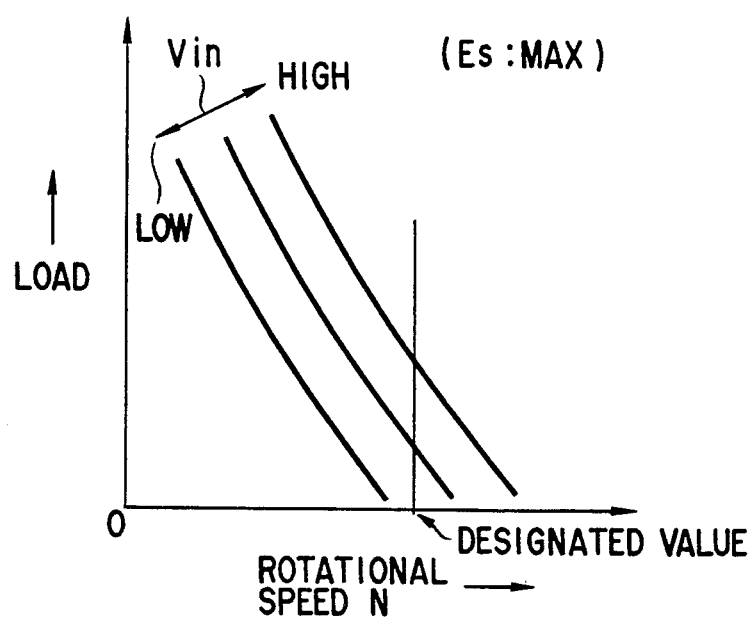
FIG. 7 is a graph showing the characteristics of a brushless motor in a conventional apparatus, which are obtained when an output voltage Es is kept maximum.
Figure 8:
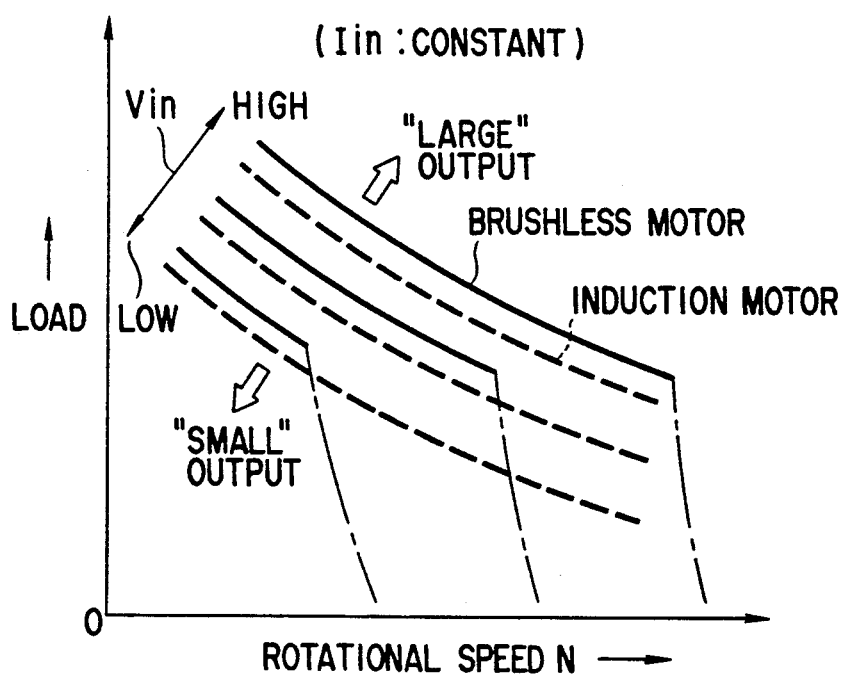
FIG. 8 is a graph showing the characteristics of a brushless motor and of an induction motor in conventional apparatuses, which are obtained when an input current Iin is kept constant.
Figure 9:
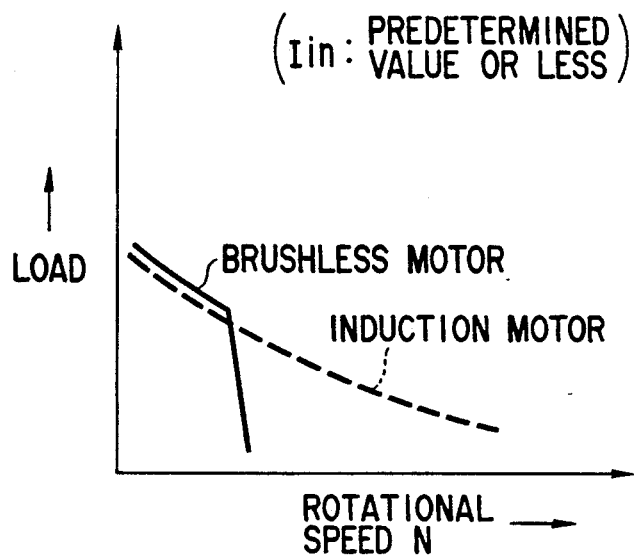
FIG. 9 is a graph showing the characteristics of the brushless motor and of the induction motor in the conventional apparatuses, which are obtained when the input current Iin is lower than a predetermined value.
Figure 10:
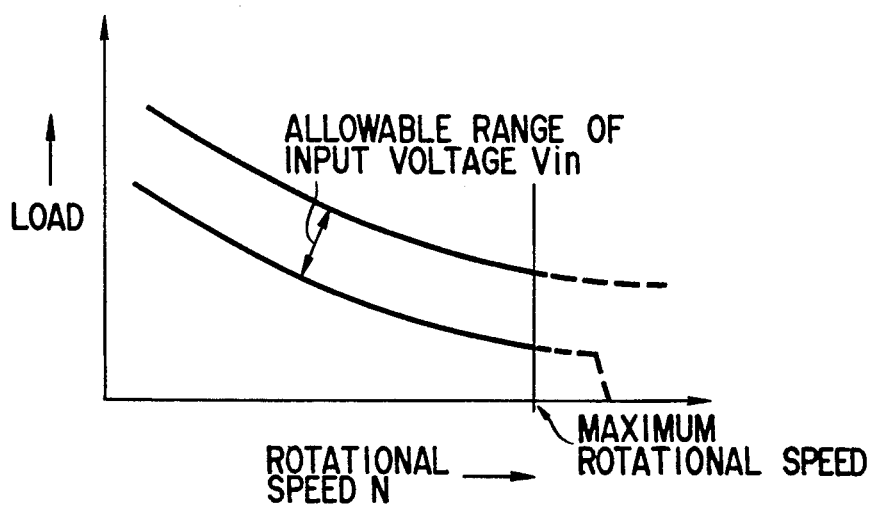
FIG. 10 is a graph showing the characteristics of a conventional, high-speed brushless motor.

As the second embodiment of the present invention, the arrangement shown in FIG. 5 may be employed. In this arrangement, a current sensor 21 is arranged on an input line to an inverter circuit 2. An output from the current sensor 21 is input to an input current detecting section 22 in a CPU 10. An output from the input current detecting section 22 is supplied to a rotational speed correcting section 23 in the CPU 10. A correction command is then supplied from the rotational speed correcting section 23 to a rotational speed control section 15. Other arrangements and functions of the second embodiment are the same as those of the first embodiment described above.

The second embodiment is designed to control the rotational speed of a brushless motor 6 for driving a compressor in a home air conditioner which is regulated such that an input current Iin to the inverter circuit 2 does not become a predetermined value or more, e.g., 20 A. That is, the second embodiment is designed to limit the input current Iin. Similar to the above embodiment, in this embodiment, a rotational speed N can be reliably set to a designated rotational speed.

In the above embodiment, the amount of phase shift of a driving signal is controlled under the condition that the rotational speed N does not reach a designated rotational speed at the maximum duty, as shown in FIG. 6A. However, the present invention is not limited to this. For example, as shown in FIG. 6B, when a designated rotational speed is a predetermined value N1 or more at a predetermined duty D1 near the maximum value, the phase shift amount may be immediately changed to a advance side. That is, in the case shown in FIG. 6B, the designated rotational speed is variably controlled between the value N1 and the maximum value by controlling the duty from a value D2 (D2<D1) to the maximum duty Max.

Figure 2C:
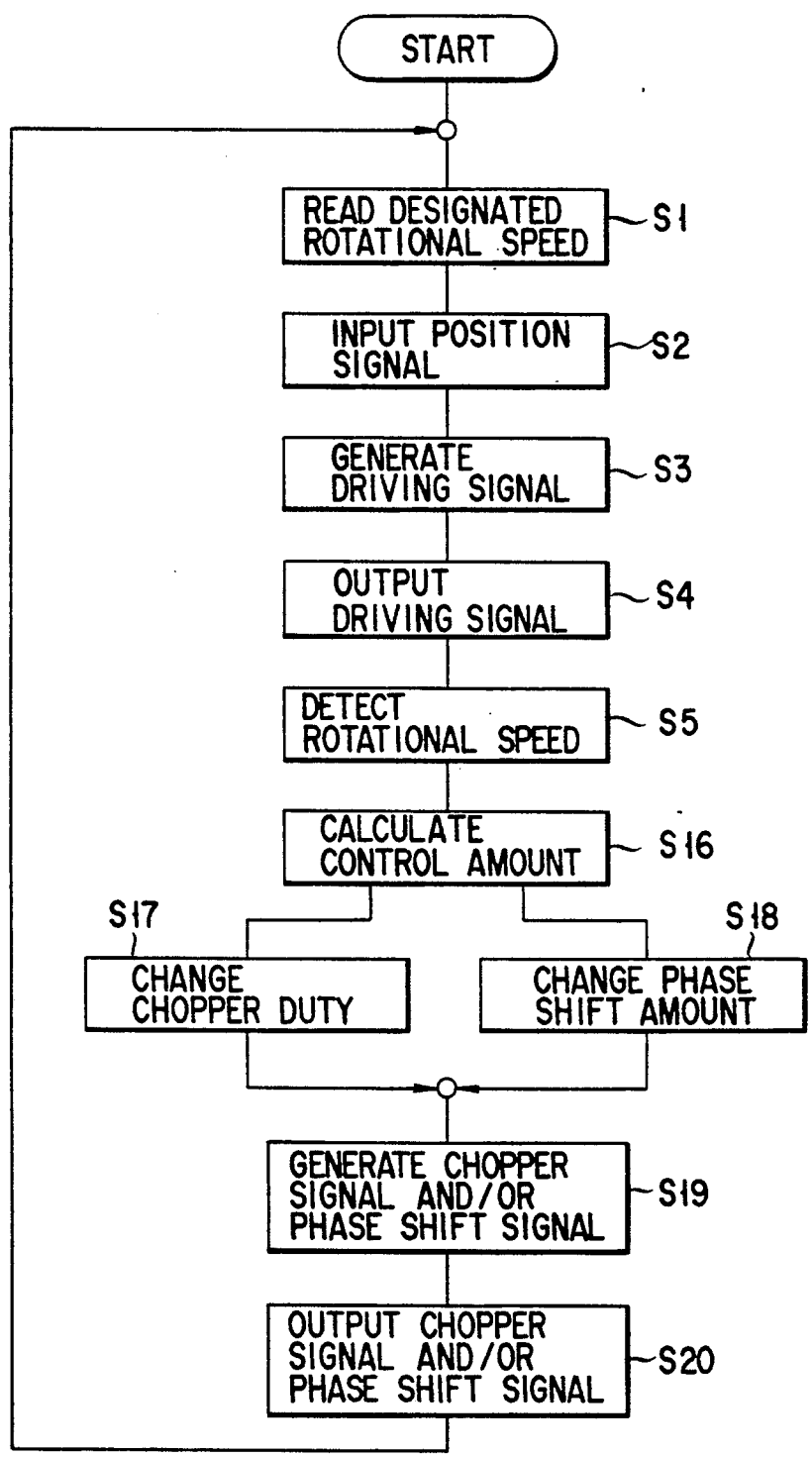

FIG. 2C is a flow chart for such a control operation. The operations in steps S1 to S5 in FIG. 2C are the same as those in FIG. 2B. In step S16, a detected rotational speed is compared with a designated rotational speed. In accordance with the comparison result, the rotational speed control section 15 is caused to select whether to change the chopper duty or the phase shift amount and is also caused to calculate a control amount. In steps S17 and S18, a chopper signal and/or a phase shift signal are generated and output in accordance with the selection and the calculated control amount.

As has been described above, according to the present invention, if a detected rotational speed does not reach a designated rotational speed even when the ON/OFF duty of the switching elements of the inverter circuit becomes a preset value or more, or a designated rotational speed is a predetermined value or more, the phase of a driving signal is advanced from that of a driving signal in a normal operation, or the duty is changed in addition to this phase shift operation. Therefore, even if an input voltage to the inverter circuit is low, a load is large, or limitations are imposed on an input current to the inverter circuit, the rotational speed of the brushless motor can be reliably set to a desired value without causing a reduction in operation efficiency, thereby providing a driving control apparatus for a brushless motor which can prevent lack of the capacity of a compressor in, e.g., an air conditioner.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A driving control apparatus for a brushless motor, in a device including the brushless motor, comprising:
    an inverter circuit for rectifying an AC power source voltage, converting the rectified voltage into a multiphase voltage having a predetermined frequency by ON/OFF operations of switching elements, and outputting the multiphase voltage as an excitation voltage to said brushless motor;
    means for detecting a position of a rotor of said brushless motor;
    means for generating a driving signal at a timing corresponding to a detected position, said driving signal being received by said brushless motor;
    means for ON/OFF-operating said switching elements of said inverter circuit while the driving signal is received by said brushless motor;
    means for detecting a rotational speed of said brushless motor;
    means for controlling a duty of the ON/OFF operations of said switching elements in accordance with a difference between a detected rotational speed and a designated rotational speed;
    means for advancing a phase of the driving signal from that of a driving signal in a normal operation if the detected rotational speed does not reach the designated rotational speed even when the duty is not less than a preset value, or if the designated rotational speed is not less than a predetermined value;
    current detecting means for detecting a current flowing in an input line of said AC power source voltage supplied to said inverter circuit; and
    rotational speed correcting means for supplying a correction signal, used for substantially regulating a rotational speed of said brushless motor, to said controlling means in accordance with the input current detected by said current detecting means.

2. An apparatus according to claim 1, further comprising:
    a compressor in a home air conditioner in which the input current is regulated to be not more than a predetermined value, said brushless motor being used to drive said compressor.

3. A driving control apparatus for a brushless motor having a plurality phase of armature windings and a rotor, comprising:
    inverter means, having a plurality of switching elements, for converting DC power into multiphase AC power having a predetermined frequency by sequentially switching said plurality of switching elements, and for applying the multiphase AC power, as multiphase excitation voltages having a predetermined phase difference, to said plurality phase of armature windings of said brushless motor, said inverter means including means for rectifying/smoothing input AC power to obtain the DC power;
    position detecting means for comparing voltages induced in said plurality phase of armature windings with a predetermined reference voltage and for detecting position signals to detect relative positions between said plurality phase of armature windings and said rotor of said brushless motor;
    driving signal generating means for generating driving signals, each having a predetermined timing relationship with a corresponding one of the position signals detected by said position detecting means;
    driving means for supplying switching signals, used for sequentially ON/OFF-operating said plurality of switching elements at a duty corresponding to a designated rotational speed of said brushless motor, to said inverter means in accordance with the driving signals generated by said driving signal generating means;
    rotational speed detecting means for detecting rotational speed of said brushless motor in accordance with the driving signals generated by said driving signal generating means;
    rotation control means for supplying a control signal, used for controlling the duty within a predetermined range, to said driving means in accordance with a difference between the rotational speed detected by said rotational speed detecting means and the designated rotational speed, and supplying a phase shift signal, used for advancing the timing relationship between the position signals and the driving signals from the predetermined timing relationship, to said driving signal generating means if the detected rotational speed does not reach a maximum value of the designated rotational speed even when the duty becomes a maximum value within the predetermined range;
    current detecting means for detecting a current flowing in an input line of said AC power supplied to said inverter means; and
    rotational speed correcting means for supplying a correction signal, used for substantially regulating a rotational speed of said brushless motor, to said rotation control means in accordance with the input current detected by said current detecting means.

4. An apparatus according to claim 3, further comprising:
    a compressor in a home air conditioner in which the input current is regulated to be not more than a predetermined value, said brushless motor being used to drive said compressor.

5. A driving control apparatus for a brushless motor having a plurality phase of armature windings and a rotor, comprising:
    inverter means, having a plurality of switching elements, for converting DC power into multiphase AC power having a predetermined frequency by sequentially switching said plurality of switching elements, and for applying the multiphase AC power, as multiphase excitation voltages having a predetermined phase difference, to said plurality phase of armature windings of said brushless motor, said inverter means including means for rectifying/smoothing input AC power to obtain the DC power;

position detecting means for comparing voltages induced in said plurality phase of armature windings with a predetermined reference voltage and for detecting position signals to detect relative positions between said plurality phase of armature windings and said rotor of said brushless motor;

driving signal generating means for generating driving signals, each having a predetermined timing relationship with a corresponding one of the position signals detected by said position detecting means;

driving means for supplying switching signals, used for sequentially ON/OFF-operating said plurality of switching elements at a duty corresponding to a designated rotational speed of said brushless motor, to said inverter means in accordance with the driving signals generated by said driving signal generating means;

rotational speed detecting means for detecting a rotational speed of said brushless motor in accordance with the driving signals generated by said driving signal generating means;

rotation control means for supplying a control signal, used for controlling the duty within a predetermined range, to said driving means in accordance with a difference between the rotational speed detected by said rotational speed detecting means and the designated rotational speed, and supplying a phase shift signal, used for advancing the timing relationship between the position signals and the driving signals from the predetermined timing relationship, to said driving signal generating means when the designated rotation speed reaches a predetermined value;

current detecting means for detecting a current flowing in an input line of said AC power supplied to said inverter means; and rotational speed correcting means for supplying a correction signal, used for substantially regulating a rotational speed of said brushless motor, to said rotation control means in accordance with the input current detected by said current detecting means.

6. An apparatus according to claim 5, further comprising:

a compressor in a home air conditioner in which the input current is regulated to be not more than a predetermined value, said brushless motor being used to drive said compressor.

* * * * *